W. H. RIDGWAY.
OVERFLOW DEVICE FOR PRESSURE TANKS, &c.
APPLICATION FILED SEPT. 7, 1906.

914,978.

Patented Mar. 9, 1909.
2 SHEETS—SHEET 1.

Witnesses:

Inventor.
William H. Ridgway,
by his Attorneys,
Howson & Howson

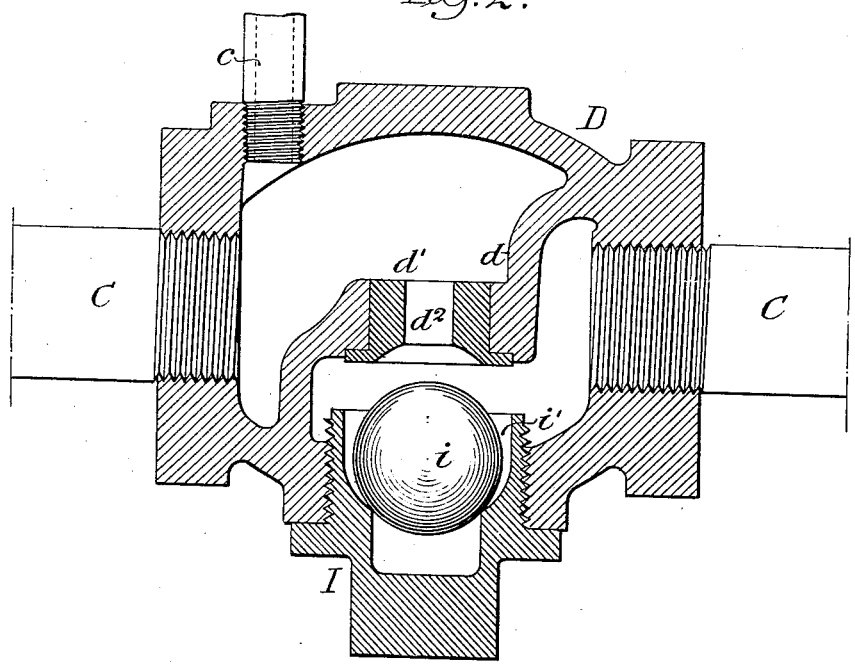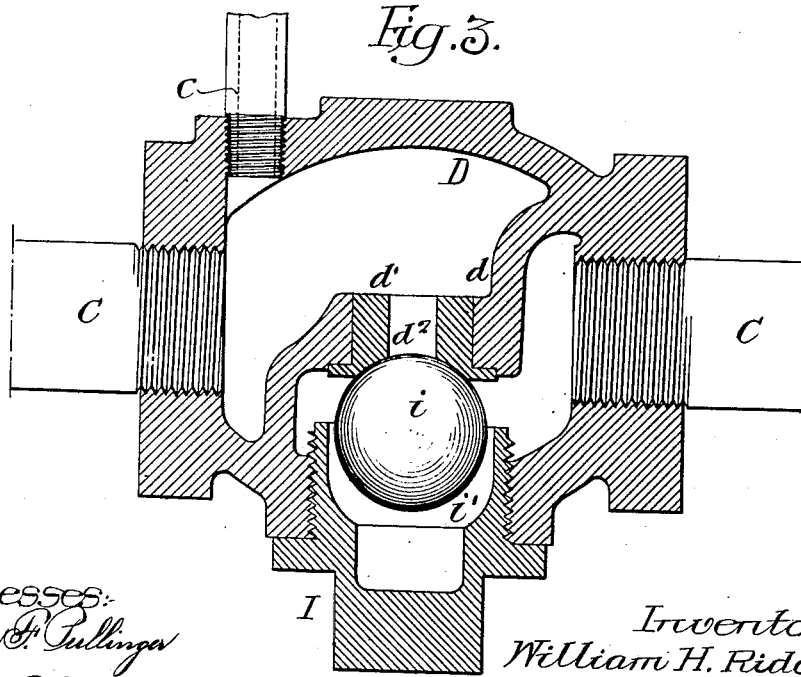

UNITED STATES PATENT OFFICE.

WILLIAM H. RIDGWAY, OF COATESVILLE, PENNSYLVANIA.

OVERFLOW DEVICE FOR PRESSURE-TANKS, &c.

No. 914,978.  Specification of Letters Patent.  Patented March 9, 1909.

Application filed September 7, 1906. Serial No. 333,616.

*To all whom it may concern:*

Be it known that I, WILLIAM H. RIDGWAY, a citizen of the United States, residing in Coatesville, Pennsylvania, have invented certain Improvements in Overflow Devices for Pressure-Tanks, &c., of which the following is a specification.

Figure 1:
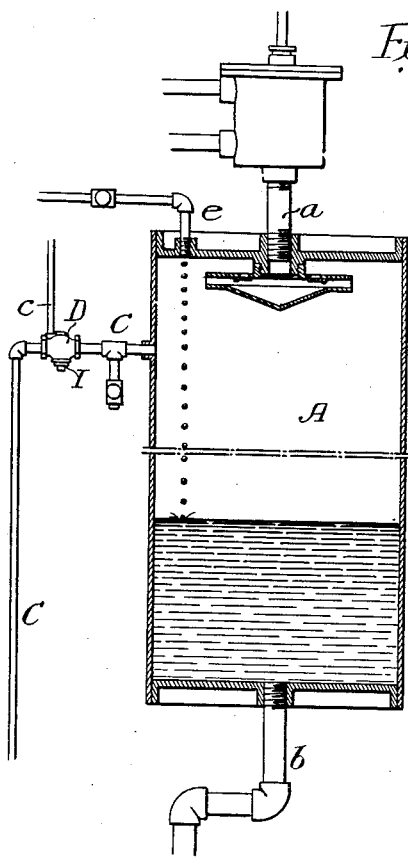
Figure 4:
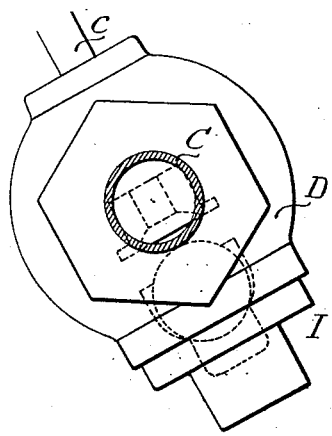

The main object of my invention is to construct a valve in such a manner that it will allow for the slow flow of liquid through it, and will close against the rush of steam or other fluid under pressure. This object I attain in the following manner, reference being had to the accompanying drawings, in which:
Figure 1, is a view of sufficient of a tank showing the application of my invention to it; Fig. 2, is a sectional view of my improved valve showing the valve in the open position; Fig. 3, is a similar view to Fig. 2, showing the valve closed, and Fig. 4, is an end view of the valve.

My invention is especially adapted for use in connection with the steam hydraulic hoist for which application for patent was filed by me on the 30th day of September, 1904, Serial No. 226,690, and allowed April 9, 1906.

Referring to Fig. 1, of the drawings, A is a pressure tank having a steam inlet pipe $a$ and an outlet pipe $b$ for the fluid within the tank, this pipe $b$ extends to the elevator cylinder in the present instance. The inflow and the outflow of steam is regulated by suitable valve mechanism, not shown in this instance, but fully described in the above mentioned application. The tank A is a closed tank, and connected to the tank is an overflow pipe C, and in order to preserve a proper supply of liquid in the tank at all times, a limited volume is constantly fed to the tank A through a suitable valved pipe $e$, the surplus liquid passing off through the overflow pipe C. This overflow pipe is provided with a valve D clearly shown in detail in Figs. 2 and 3; which is so constructed that the liquid when it reaches the overflow pipe will pass slowly through the pipe C, past the valve to waste, but should there be a quick inrush of steam or other fluid under pressure, such as would pass through the pipe $a$, for instance, the valve would immediately close preventing the escape of the steam through the overflow pipe C, causing the pressure of the steam to force the liquid into the tank out through the pipe $b$ to actuate the piston in the cylinder in the elevator or other machine. It will be understood that by allowing the steam to exhaust through the pipe $v$, the liquid would return through the pipe $b$ into the tank.

Referring now to Figs. 2 and 3, D is the valve casing having a partition $d$, in which is a valve seat $d'$ with a reduced opening $d^2$. $i$ is a ball valve made solid in the present instance, to give it sufficient weight to quickly drop off the seat when the fluid pressure is cut off. This ball rests, when free of the valve seat, in a pocket $i'$ in a plug I inserted in the underside of the valve casing D. The relation of the ball to the seat is such that when the fluid in the tank or other suitable container, reaches the overflow pipe, it will flow through the valve casing and pass the valve without disturbing it, or should steam or other fluid under pressure be turned into the tank, the rush of steam through the overflow pipe will act upon the ball and lift it immediately to its seat as clearly illustrated in Fig. 3. The ball will remain in this position, closing the valve until the steam or other fluid under pressure is allowed to escape from the tank, when the ball will immediately drop to the position shown in Fig. 2, and if the liquid in the tank reaches the overflow pipe it will slowly flow through the valve casing and past the valve to waste.

In order to break the vacuum on the exhaust side of the partition $d$ of the valve casing D, I provide a vent $c$, otherwise the ball may, in some instances, be retained against its seat after the steam pressure was reduced.

In setting up the mechanism the valve casing D is to be very carefully adjusted so that the inrush of steam will cause the ball to close against its seat, as it will be seen that the ball must be lifted bodily against its seat in order to close the valve, and in some instances, as shown in Fig. 4, the valve casing may have to be turned so that the valve casing will be set at an angle to the vertical to permit the ball to more readily close against its seat.

I claim:—

1. The combination of a valve casing having a transverse partition with a comparatively small opening therein, a deep pocket in the casing under the partition, a weighted ball less in diameter than the pocket and normally resting in the pocket, the major portion of the ball being within the pocket, said casing having an inlet passage at one side and communicating with the space between the upper edge of the pocket and the lower edge of the partition so that the ball will not be affected by the flow of liquid but will be raised by the action of steam or other fluid under pressure so as to close the opening in the partition.

2. The combination of a tank, an overflow pipe therefor, a valve casing connected to the overflow pipe, said valve casing having a transverse partition, a valve seat mounted in the partition and having a reduced opening, a removable plug screwed into the underside of the valve casing directly under the valve seat, said plug having a pocket, a weighted ball valve less in diameter than the diameter of the pocket, said ball valve normally resting in the pocket, the ball and casing being so constructed and arranged to permit the ball to rise bodily and to close against a seat when steam or fluid under pressure is admitted to the tank, but when the liquid in the tank overflows through the pipe the valve will not be raised to check the flow of the liquid, substantially as described.

In testimony whereof, I have signed my name to this specification, in the presence of two subscribing witnesses.

WILLIAM H. RIDGWAY.

Witnesses:
WILL. A. BARR,
JOS. H. KLEIN.